United States Patent [19]
Birang

[11] Patent Number: 5,846,882
[45] Date of Patent: Dec. 8, 1998

[54] ENDPOINT DETECTOR FOR A CHEMICAL MECHANICAL POLISHING SYSTEM

[75] Inventor: Manoocher Birang, Los Gatos, Calif.

[73] Assignee: Applied Materials, Inc., Santa Clara, Calif.

[21] Appl. No.: 725,607

[22] Filed: Oct. 3, 1996

[51] Int. Cl.[6] .................................................. H01L 21/00
[52] U.S. Cl. .......................... 438/692; 438/14; 156/345; 216/84; 216/88
[58] Field of Search .................................. 438/8, 14, 691, 438/642, 692, 747; 216/38, 84, 86, 88, 90, 92; 156/345 LC, 345 MT, 345 LP

[56] References Cited

U.S. PATENT DOCUMENTS

| | | | |
|---|---|---|---|
| Re. 34,425 | 11/1993 | Schultz | 51/165.74 |
| 3,702,043 | 11/1972 | Welbourn et al. | 51/92 R |
| 4,442,494 | 4/1984 | Fromson et al. | 364/511 |
| 4,793,895 | 12/1988 | Kaanta et al. | 156/627 |
| 5,036,015 | 7/1991 | Sandhu et al. | 437/8 |
| 5,069,002 | 12/1991 | Sandhu et al. | 51/165 R |
| 5,081,421 | 1/1992 | Miller et al. | 324/671 |
| 5,081,796 | 1/1992 | Schultz | 51/165.74 |
| 5,213,655 | 5/1993 | Leach et al. | 156/627 |
| 5,222,329 | 6/1993 | Yu | 51/165.77 |
| 5,240,552 | 8/1993 | Yu et al. | 156/636 |
| 5,242,524 | 9/1993 | Leach et al. | 156/345 |
| 5,244,527 | 9/1993 | Aoyagi | 156/345 |
| 5,308,438 | 5/1994 | Cote et al. | 156/636 |
| 5,321,304 | 6/1994 | Rostoker | 257/621 |
| 5,337,015 | 8/1994 | Lustig et al. | 324/671 |
| 5,413,941 | 5/1995 | Koos et al. | 437/8 |
| 5,433,651 | 7/1995 | Lustig et al. | 451/6 |
| 5,439,551 | 8/1995 | Meikle et al. | 156/626.1 |
| 5,595,526 | 1/1997 | Yau et al. | 451/8 |
| 5,618,447 | 4/1997 | Sandhu | 216/88 X |
| 5,637,031 | 6/1997 | Chen | 451/41 |
| 5,643,050 | 7/1997 | Chen | 451/10 |
| 5,667,629 | 9/1997 | Pan et al. | 438/13 |

*Primary Examiner*—William Powell
*Attorney, Agent, or Firm*—Fish & Richardson, P.C.

[57] ABSTRACT

An endpoint detector for a substrate polishing apparatus integrates a signal indicative of the instantaneous material removal rate from the substrate. The signal is generated by a monitor which measures a motor parameter such as torque or current draw. The resulting sum is compared to a baseline sum known to yield the desired polishing to predict the polishing endpoint.

15 Claims, 5 Drawing Sheets

ENDPOINT DETECTOR FOR A CHEMICAL MECHANICAL POLISHING SYSTEM

BACKGROUND OF THE INVENTION

The present invention relates generally to chemical mechanical polishing of substrates, and more particularly to detection of a polishing endpoint by monitoring the quantity of material removed from a substrate.

Chemical mechanical polishing (CMP) is one method of providing a planarized substrate surface. Such substrates are used in the manufacture of integrated circuit devices. CMP is used to planarize raw substrates, i.e., substrates which have been cut from a boule, and to planarize layers which have been deposited on a substrate. A typical CMP apparatus employs a rotating polishing surface, such as a consumable polishing pad, against which the surface of the substrate being polished is placed. The CMP apparatus also includes a carrier which secures the substrate in a desired position with respect to the pad. The carrier may include means for rotating, vibrating or oscillating the substrate. During polishing, a slurry having both chemical and abrasive agents is supplied to the interface between the substrate and the pad to enhance the rate at which material is removed from the substrate.

One problem associated with CMP is endpoint detection. An object of polishing is to provide a planar surface. Also, where a deposited layer is being polished, another object is to remove a predictable amount of material from the layer. Because the substrate is polished face down, the device fabricator cannot easily view the progress of the polishing operation. In addition, the fabricator easily determine the polishing "endpoint", i.e., the point at which polishing is complete.

Variations in the polishing conditions impede an accurate determination of the polishing endpoint. For example, variations in the slurry composition, pad condition, relative speed between the pad and the substrate, and the load of the substrate on the pad cause variations in the material removal rate. The variations in the material removal rate cause variations in the time needed to reach the polishing endpoint. Therefore, the polishing endpoint cannot be estimated merely as a function of polishing time.

One approach to predicting the polishing endpoint is to remove the substrate from the polishing surface and measure the substrate thickness. By periodically removing the substrate from the polishing surface and measuring its thickness, the quantity of material being removed from the substrate may be determined. As such, a linear approximation of the material removal rate may be used to determine the polishing endpoint. However, this method is time consuming, and does not account for sudden changes in the removal rate that may occur between measurement intervals.

Several non-invasive methods of endpoint detection are known. These methods generally fall into two categories: those which require access to the underside of the substrate, and those which determine the polishing endpoint by detecting changes in the operation of the polishing apparatus.

The methods of the first type typically require access to at least a portion of the substrate surface being polished, such as by sliding a portion of the substrate over the edge of the polishing pad, and simultaneously analyzing the exposed portion of the substrate. For example, where polishing is used to expose metal lines embedded in a dielectric layer, the overall or composite reflectivity of the surface being polished changes as the lines are exposed. By monitoring the reflectivity of the polished surface or the wavelength of light reflected from the surface, the exposure of the lines through the dielectric layer, and thus the polishing endpoint, can be detected. However, this method does not provide a way of determining the polishing endpoint unless an underlying layer is exposed during polishing. Additionally, it is somewhat erratic in predicting the polishing endpoint unless all of the underlying lines are simultaneously exposed. Furthermore, the detection apparatus is delicate and subject to frequent breakdown caused by the exposure of the measuring or detecting apparatus to the slurry.

The other methods for determining the polishing endpoint monitor various process parameters, and indicate an endpoint when one or more of the parameters abruptly change. For example, the coefficient of friction at the interface of the polishing pad and the substrate is a function of the slurry composition, the pad condition, the load of the substrate on the pad, and the surface condition of the substrate. Where an insulative or dielectric layer is being polished to expose an underlying metal layer, the coefficient of friction will change when the metal layer is exposed. As the coefficient of friction changes, the torque necessary to provide the desired polishing pad speed also changes. By monitoring this change, the endpoint may be detected.

In an ideal system where no parameter other than the substrate surface changes, this method of endpoint detection is acceptable. However, as the substrate is being polished, the pad condition and the slurry composition at the pad-substrate interface also change. Such changes may mask the exposure of the underlying metal layer, or they may imitate an endpoint condition, leading to premature removal of the substrate from the polishing apparatus. Additionally, with this method, as well as with the reflectivity motoring method, the endpoint detector will work only if polishing is used to expose an underlying material having an optical or a frictional attribute different than the material being removed. Therefore, neither system is acceptable where only planarization is being provided, or where an underlying material having similar optical or frictional attributes to the overlying layer is to be exposed during polishing.

In view of the foregoing, there is a need for a polishing endpoint detector which accurately and reliably determines when to cease polishing.

SUMMARY OF THE INVENTION

In general in one aspect, the invention relates to an endpoint detector for a chemical mechanical polishing apparatus. The polishing apparatus has a polishing surface, a positioning member for positioning a substrate in contact with the polishing surface, and a motor for creating relative movement between the polishing surface and the substrate. A monitor measures the power input to the motor and generates an output signal representing the power input. An accumulator receives the output signal and sums the output signal over time, and a comparator compares the sum to a predetermined sum to indicate when an endpoint has been reached.

Implementations include the following. The endpoint detector may terminate polishing when the predetermined sum has been reached. The monitor may include a current meter, a torque meter, and/or a voltage meter. The accumulator and the comparator may be combined in a processor.

In general, in another aspect, the invention relates to a method of determining a polishing endpoint. A substrate is polished on a polishing surface, and the polishing surface and substrate are moved with respect to one another by a motor. A condition of the motor which is indicative of the frictional load on the motor is summed, and the sum is compared to a predetermined sum to detect the polishing endpoint.

Implementations include the following. The motor speed may be controlled with a control circuit which generates an error signal corresponding to changes in motor speed. The summed motor condition may be current draw, torque, a multiple of current draw and voltage draw, or the error signal. The achievement of the polishing endpoint may be indicated on a display when the sum reaches the predetermined sum.

In general, in another aspect, the invention relates to an endpoint detector for a chemical mechanical polishing apparatus. The polishing apparatus includes a polishing surface, a positioning member for positioning the substrate in contact with the polishing surface, and a plurality of motors for creating relative movement between the polishing surface and the substrate. The endpoint detector has a plurality of monitors for measuring the power input to each motor and generating a plurality of output signals representing the power input to each motor. An accumulator receives the output signals and sums the output signals over time, and a comparator circuit receives the sum and compares the sum to a predetermined sum to indicate when an endpoint condition has been reached.

Advantages of the invention include the following. The detector indicates endpoint based upon a continuous summation of polishing parameters as polishing is occurring, rather than on a change in a parameter which may occur at the polishing endpoint.

Advantages of the invention will be set forth in the description which follows, and in part will be obvious from the description, or may be learned by practice of the invention. The advantages of the invention may be realized by means of the instrumentalities and combinations particularly pointed out in the claims.

BRIEF DESCRIPTION OF THE DRAWINGS

The accompanying drawings, which are incorporated in and constitute a part of the specification, schematically illustrate the invention, and together with the general description given above and the detailed description given below, serve to explain the principles of the invention.

DETAILED DESCRIPTION OF THE INVENTION

Figure 1:
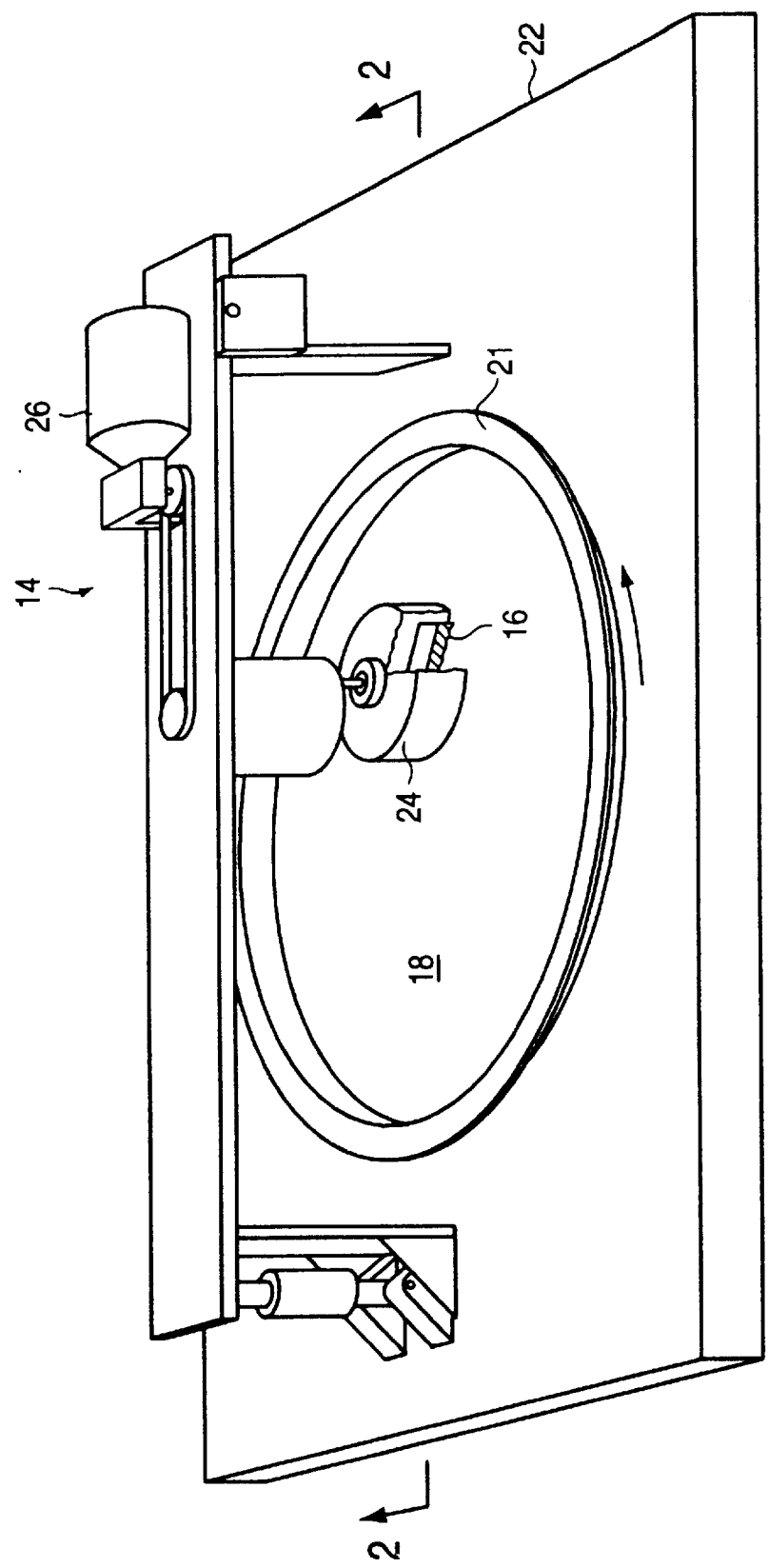
FIG. 1 is a perspective view, partially in section, of a representative chemical mechanical polishing apparatus with which the invention may be used.
Figure 2:
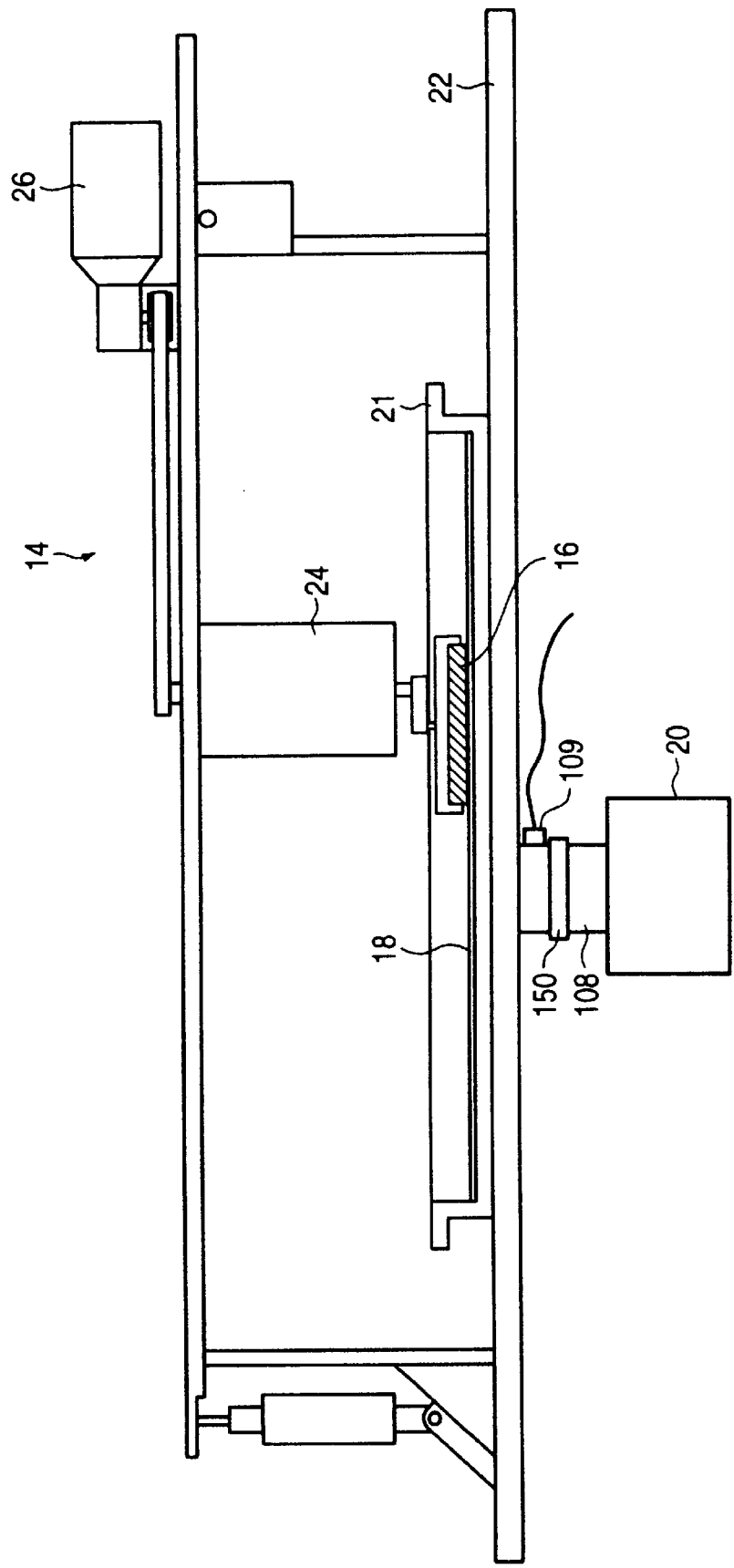
FIG. 2 is a sectional view of FIG. 1 at line 2—2.

Referring to FIGS. 1 and 2, a chemical mechanical polishing apparatus 14 is used to polish a substrate 16. An endpoint monitoring apparatus, which is preferably coupled to the control system for polishing apparatus 14, monitors or detects the polishing endpoint during the polishing process. The endpoint monitoring apparatus causes the polishing apparatus to cease polishing and to remove substrate 16 from the polishing surface of a polishing pad 18 when polishing endpoint has been achieved. One or more motors rotate the polishing pad and the substrate. The power input to the motors is instantaneously summed to indicate the total quantity of material removed from the substrate. When the sum equals a predetermined reference or baseline sum, which represents the quantity of material to be removed, the polishing endpoint is achieved. The reference sum is determined experimentally for a given layer material or substrate material for given polishing parameters. Specifically, a plurality of substrates may be polished under a variety of polishing conditions or parameters. The polishing parameters may include the pad material, rotational speed of the polishing pad and carrier head, substrate load, and slurry composition.

The polishing apparatus 14 generally includes a housing 22 which supports a rotatable platen 21. The polishing pad 18 is adhesively attached to platen 21 to provide the polishing surface. A drive motor 20 (see FIG. 2) is mounted to the underside of housing 22 and is coupled to platen 21 by a drive shaft 108. A positioning member or carrier 24 is positioned over polishing pad 18. The substrate 16 is positioned in carrier 24 for placement against polishing pad 18. As the polishing pad rotates, the carrier may likewise rotate, oscillate or vibrate. A second drive motor 26, such as a d.c. induction motor, may be coupled to carrier 24 to provide power to rotate, oscillate or vibrate the carrier. As illustrated, the second drive motor is configured to provide orbital motion of the carrier.

Figure 3:
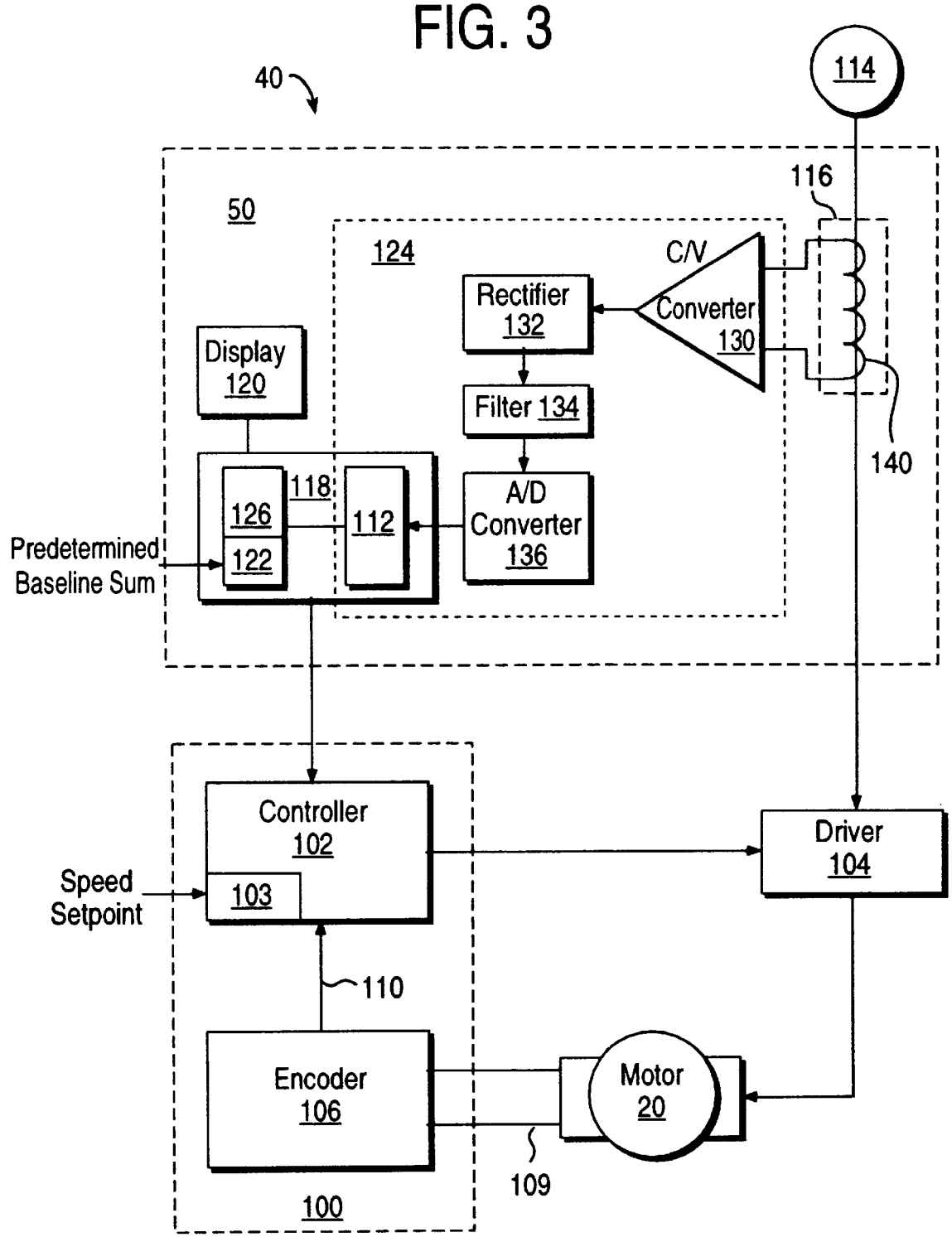
FIG. 3 is schematic view of a circuit for monitoring the polishing of a substrate on the apparatus of FIG. 1 to provide a polishing endpoint indication.

Referring now to FIG. 3, a schematic control circuit 40 for detecting a polishing endpoint and for controlling the rotational speed of the polishing pad and the carrier is shown. The control circuit 40 includes an endpoint detection circuit 50 and a feedback control circuit 100. Feedback control circuit 100 monitors and controls motors 20 and 26. In FIG. 3, only one feedback control circuit, for monitoring and controlling motor 20, is shown. The feedback control circuit used to control motor 26 is may be identical in construction. The endpoint detection circuit 50 measures the total power input to the motors 20 and/or 26.

Generally, the rotational speed of each of the motors 20 and 26 is set prior to polishing. The feedback control circuit 100 includes a controller 102, such as a virtual machine environment (VME) Bus. Controller 102 may accept and store a speed setpoint, i.e., an intended speed of the motor, in a memory 103. The controller 102 drives motor 20 through a motor driver amplifier 104. An encoder 106 measures the rotational speed of drive shaft 108 of motor 20 through a speed pickup 109 (see FIG. 2). The encoder delivers a speed signal on line 110 to controller 102 which corresponds to the output speed of drive shaft 108. Upon receiving the speed signal from encoder 106, the controller compares the speed of the drive shaft to the intended speed, and modifies the signal to the motor driver amplifier to increase or decrease the rotational speed of the drive shaft as necessary to match the intended speed.

Motor 20 is powered by motor driver amplifier 104. Motor driver amplifier 104 receives its input power from a power supply 114. The power supplied through motor driver amplifier 104 is proportional to the frictional load at the interface between the pad and substrate, assuming other frictional thermal losses are constant. The total power input to motor 20 is measured by endpoint detection circuit 50.

The endpoint detector circuit 50 includes a monitor 116 to measure the power supplied to motor 20, an accumulator 124 to sum the output of monitor 116, and a comparator 126 to compare the sum to a predetermine sum. The endpoint detection circuit 50 may also include a display 120 to continuously display the sum as it accrues.

The accumulator may be an integrator or a summer, and may be implemented as a hardware circuit, as a software program running on a programmed digital computer, as firmware, or as some combination thereof. The accumulator may be a separate circuit or a part of a signal processor 118.

The total power input to the motor is compared to a previously determined baseline sum which is known to provide the desired quantity of material removal from the substrate. When the total power equals the predetermined baseline sum, the polishing apparatus has reached the polishing endpoint.

The power supplied through motor driver amplifier 104 may be calculated by integrating the product of the current and voltage to determine the total power input to the motor. The total power P at time T may be calculated from the equation:

$$P(T) = \int_0^T I(t) \cdot V(t) dt$$

where I(t) is the current and V(t) is the voltage. The total quantity of material removed from the substrate, D, may be calculated from the equation:

$$D(T) = P(T) \cdot k$$

where k is an experimentally determined conversion factor which relates the quantity of material removed to the summed power. The quantity of material removed from each substrate may be measured at a series of specific sums of power input to the motor and the slope of the resulting function may be calculated to estimate k.

The comparison of the sum to the predetermined baseline sum may be performed by a comparator 126. Comparator 126 may be a separate circuit or it may be part of signal processor 118. Signal processor 118 may store the predetermined baseline sum in a memory 122. The signal processor may compare the sum to the predetermined baseline sum and display a visual signal indicative of achievement of polishing endpoint on display 120 when the predetermined baseline sum is reached. Also, a signal may be transmitted from signal processor 118 to controller 102 to terminate polishing when the predetermined baseline sum is reached. One signal processor 118 and one display 120 may be provided for both motors 20 and 26.

Figure 6:
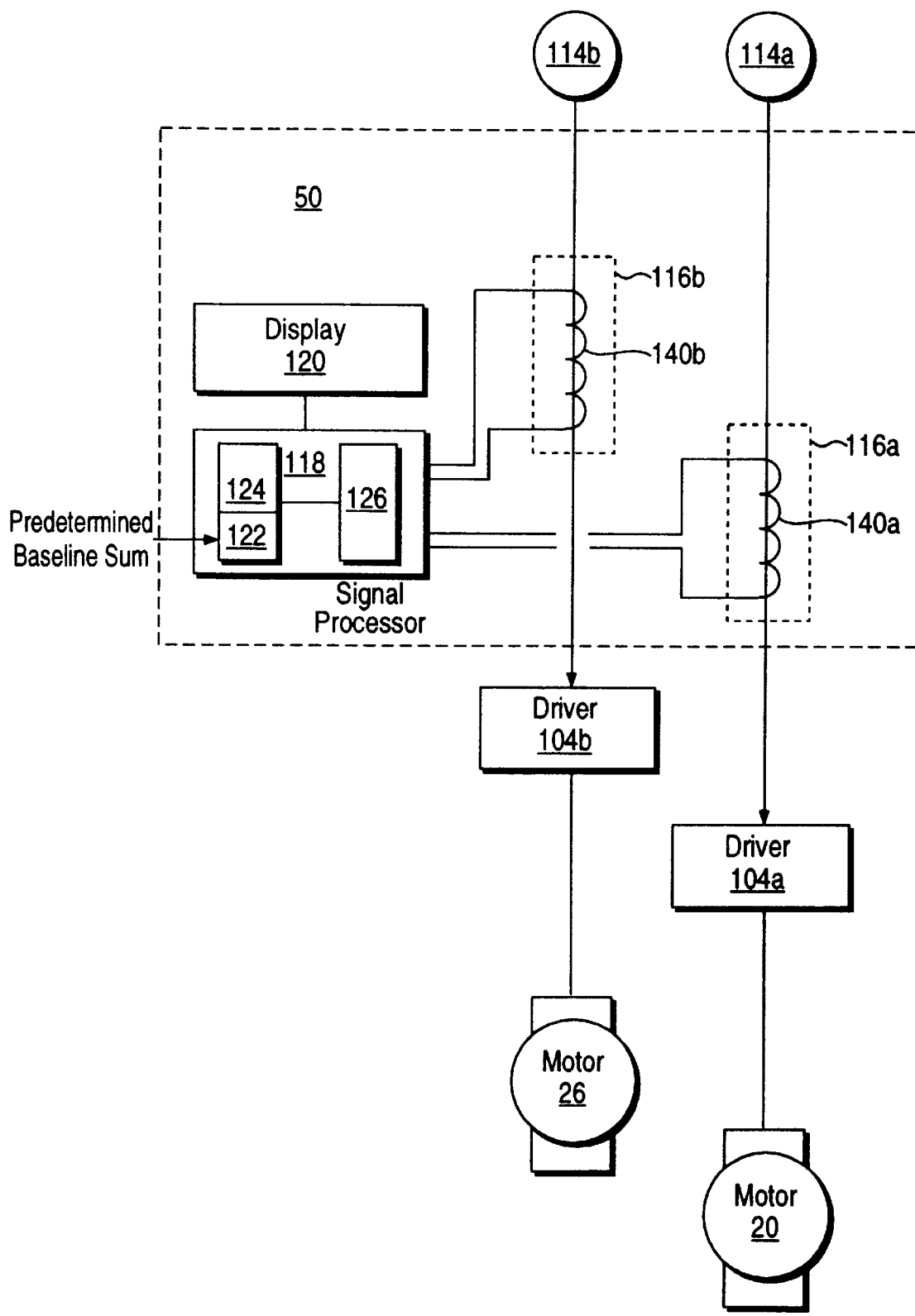
FIG. 6 is schematic view of a circuit which includes a plurality of monitors to measure the power input to each of a plurality of motors.

The nearest approximation of the total power expended at the polishing surface-substrate interface is the combined power supplied to the substrate by both motors 20 and 26. However, the power supplied to motor 20 connected to platen 21 constitutes the majority of the power used by the polishing system. Therefore, as shown in FIG. 3, the power to motor 20 from motor driver amplifier 104 may be summed to give an adequate estimate of the quantity of material removed from the substrate during polishing. However, as shown in FIG. 6, the power to both motors 20 and 26 from motor driver amplifiers 104a and 104b may be measured by monitors 116a and 116b. The power signals from monitors 116a and 116b are summed by signal processor 118 to calculate the total power provided to the substrate.

The endpoint detector may also be used to monitor the polishing conditions at the pad-substrate interface. For example, changes in polishing parameters, and in the quality of the consumables used to polish, affect the current drawn by the motors. If the pad swells, the current drawn by the motors to maintain the preselected rotational speed increases. If the pad becomes glazed, the current drawn by the motors to maintain the preselected rotational speed decreases. Additionally, changes in the slurry concentration at the interface affect the current drawn by the motors.

The described invention provides a convenient mechanism for monitoring the rate at which the material is removed from the substrate and the total quantity of material removed, without the need to remove the substrate from the polishing surface and without interruption of the polishing operation. The invention also provides a mechanism to detect a polishing endpoint where an underlying layer of a different material is not exposed. Therefore, the method and apparatus described herein may be used to determine polishing endpoint for any material being polished and for raw wafer polishing, without disturbing the polishing operation.

Returning to FIG. 3, motor 20 may be a d.c. motor and power supply 114 may provide a substantially uniform voltage to the motor. In this implementation, the monitor 116 includes a current meter 140. The current supplied to the motor 20 is measured by a current meter 140 as the current is summed to calculate the total power supplied to the motor. Motor 20 is set at a constant speed by feedback control circuit 100, and the motor will draw more current in response to increased loading (indicating increased friction and thus increased wear), and less current in response to decreased loading (indicating less friction and thus less wear) in order to maintain a constant speed. Thus, by summing the current supplied to motor 20 and comparing it to a predetermined sum indicative of polishing endpoint for a given material and set of polishing parameters, a polishing endpoint may be predicted.

Assuming a constant voltage, the total quantity of material removed may be calculated from the equation $$D(T) = \int_0^T kV \cdot I(t) dt$$

The sum or integration is performed by the accumulator. Accumulator 124 may include a current-to-voltage converter 130, a rectifier 132, a low pass filter 134, and an A/D converter 136, to generate an averaged and digitized value of the current supplied to motor 20. The output of A/D converter 136 may be provided to a summing program 112 in signal processor 118.

If a multi-phase current is supplied to motor 20, then there may be a voltage converter, rectifier and low pass filter for each phase. The output of each filter may be combined by an adder, and the output of the adder may be supplied to the A/D converter.

Figure 4:
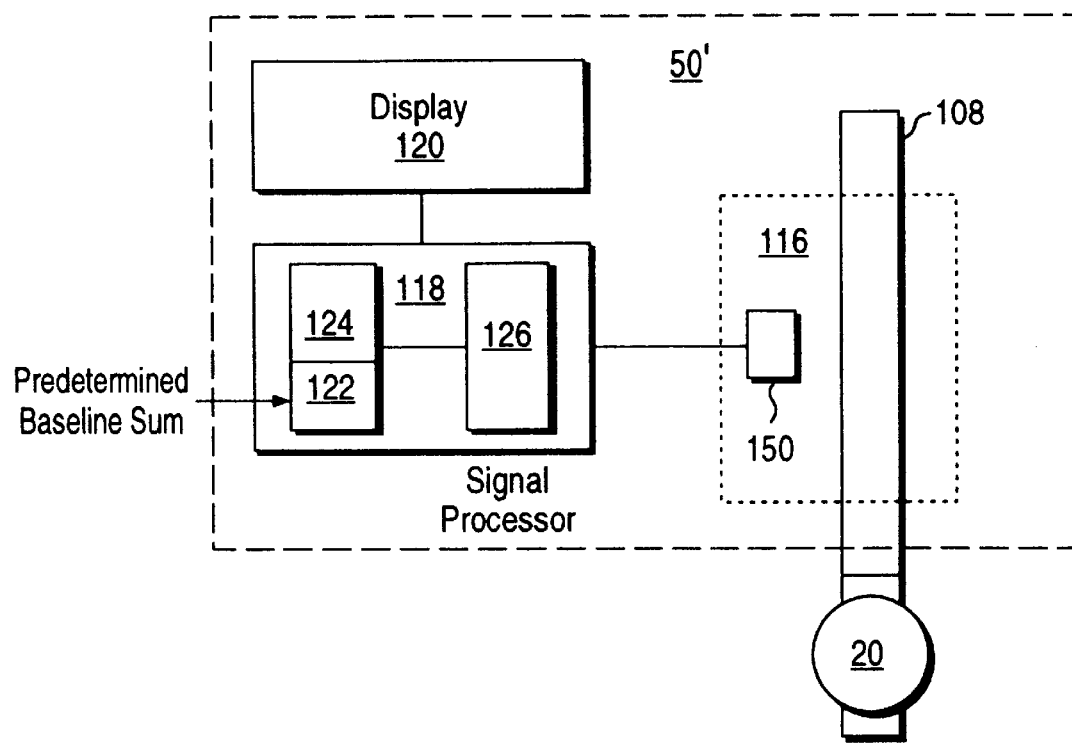
FIG. 4 is schematic view of a circuit which includes a torque meter for monitoring the polishing of a substrate.

In another embodiment, shown in FIG. 4, rather than summing the current draw of motor 20, the motor torque is summed. The monitor 116 of endpoint detection circuit 50' includes a torque meter 150. The torque meter 150 is placed on drive shaft 108 (see FIG. 2). The output of torque meter 150 is connected to signal processor 118. The signal processor sums the output of the torque meter. This sum may be compared to a baseline sum to determine the polishing endpoint. This is possible because the torque necessary to maintain the motor at a constant speed changes depending on the load seen by the motor. This is directly proportional to the frictional load at the substrate-polishing surface interface and is likewise directly proportional to the material removal rate.

Figure 5:
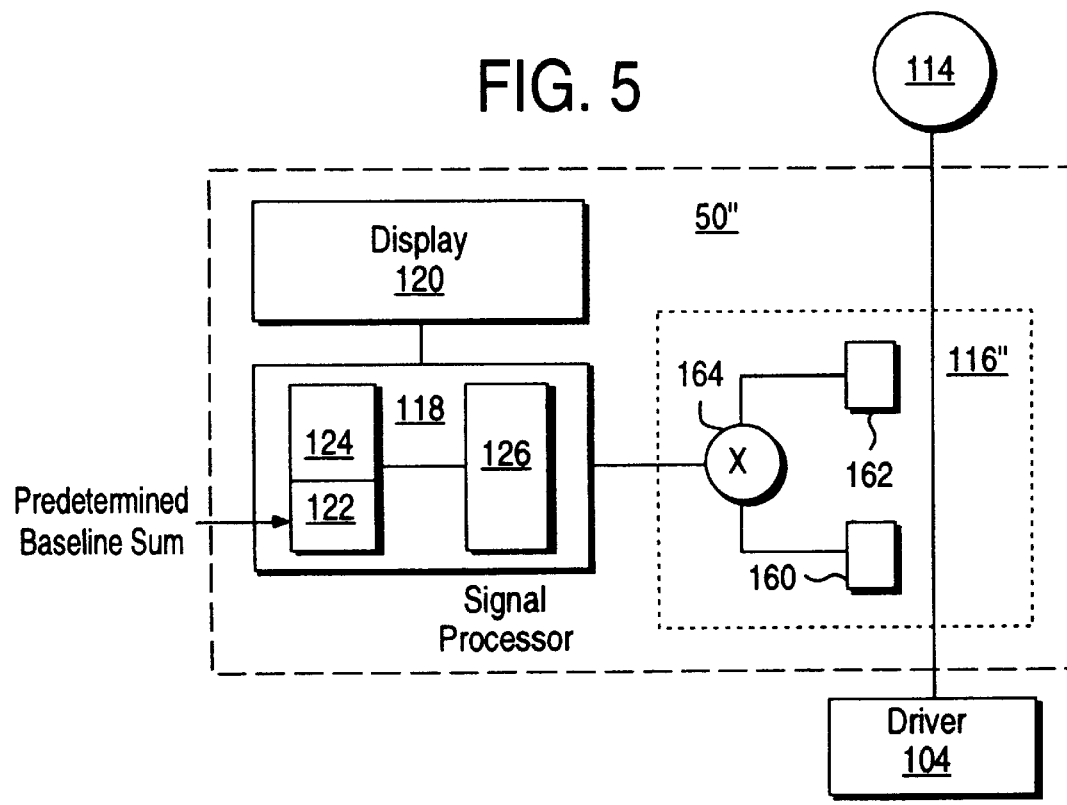
FIG. 5 is schematic view of a circuit which includes a current meter and a voltage meter for monitoring the polishing of a substrate.

In yet another embodiment, shown in FIG. 5, an a.c. motor is used as motor 20 (or motor 26) and power supply 114 provides an a.c. signal to the motor. Power supply 114 may be an AC power line operating at 120 volts and 60 Hz. The material removal rate, and thus the polishing endpoint, may be determined by summing the product of current and the voltage supplied to motor 20 and multiplying that product by the power factor of the motor. The monitor 116 of endpoint detection circuit 50" includes a current meter 160 and a voltage meter 162 measure the current and voltage, respectively, of the power supply 114. Current meter 160 and voltage meter 162 are connected to a multiplier 164, which multiplies the measured voltage by the measured current. The output of multiplier 164 is connected to signal processor 118. The signal processor sums the output of the multiplier. This sum may be compared to a baseline sum to determine the polishing endpoint.

In summary, the polishing endpoint may be predicted by continuously monitoring the polishing system, summing the motor inputs related to motor power use, and comparing the summed inputs to a known value which provides a known quantity of removed material.

The present invention has been described in terms of a preferred embodiment. The invention, however, is not limited to the embodiment depicted and described. Rather, the scope of the invention is defined by the appended claims.

What is claimed is:

1. An endpoint detector for a chemical mechanical polishing apparatus having a polishing surface, a positioning member for positioning a substrate in contact with the polishing surface, and a motor for creating relative movement between the polishing surface and the substrate, comprising:

a monitor to measure the power input to the motor and generate an output signal representing the power input;

an accumulator to sum the output signal over time; and a comparator to compare the sum to a reference value to indicate when an endpoint condition has been reached.

2. The endpoint detector of claim 1 wherein the comparator supplies a signal to a controller which terminates polishing when the reference value has been reached.

3. The endpoint detector of claim 1 wherein the monitor includes a current meter.

4. The endpoint detector of claim 1 wherein the monitor includes a torque meter.

5. The endpoint detector of claim 1 wherein the monitor includes a current meter and a voltage meter.

6. The endpoint detector of claim 1, further comprising a processor, the processor including the accumulator and the comparator.

7. A method of determining the polishing endpoint of a substrate polished on a polishing surface, wherein the polishing surface and substrate are moved with respect to one another by a motor, comprising the steps of:

summing a condition of the motor which is indicative of the frictional load on the motor; and comparing that sum to a reference value to detect a polishing endpoint.

8. The method of claim 7 further comprising indicating the achievement of the polishing endpoint on a display when the sum reaches the reference value.

9. The method of claim 7 wherein the summed motor condition is current draw.

10. The method of claim 7 wherein the summed motor condition is torque.

11. The method of claim 7 wherein the summed motor condition is current draw multiplied by voltage draw.

12. The method of claim 7 further comprising controlling the motor speed with a control circuit which generates an error signal corresponding to changes in motor speed.

13. The method of claim 12 wherein the summed motor condition is the error signal.

14. An endpoint detector for a chemical mechanical polishing apparatus having a polishing surface, a positioning member for positioning the substrate in contact with the polishing surface, and a plurality of motors for creating relative movement between the polishing surface and the substrate, comprising:

a plurality of monitors for measuring a power input to each motor and generating a plurality of output signals representing the power input to each motor;

an accumulator to receive the output signals and sum the output signals over time; and a comparator to compare the sum to a reference value and indicate an endpoint condition when the reference value has been reached.

15. An endpoint detector for a chemical mechanical polishing apparatus having a polishing surface, a positioning member for positioning the substrate in contact with the polishing surface, and a motor for creating relative movement between the polishing surface and the substrate, comprising:

a monitor for measuring a power input to the motor and generating an output signal representing the power input; and a processor to receive the output signal and sum it over time and to compare the sum to a reference value to indicate when an endpoint condition has been reached.

* * * * *

UNITED STATES PATENT AND TRADEMARK OFFICE
CERTIFICATE OF CORRECTION

PATENT NO. : 5,846,882
DATED : December 8, 1998
INVENTOR(S) : Birang

It is certified that error appears in the above-identified patent and that said Letters Patent is hereby corrected as shown below:

Column 4, line 42, delete "is".

Column 5, line 4, "predetermine " to --predetermined--.

Signed and Sealed this

Thirtieth Day of March, 1999

Attest:

Q. TODD DICKINSON

*Attesting Officer*   *Acting Commissioner of Patents and Trademarks*